(12) United States Patent
Richardson, II et al.

(10) Patent No.: US 6,419,304 B1
(45) Date of Patent: Jul. 16, 2002

(54) INTERIOR ENCLOSURE FOR VEHICLES

(75) Inventors: Wayne A. Richardson, II, Glendale; Mark J. Owsiany, Peoria, both of AZ (US)

(73) Assignee: O-R Fab, Inc., Phoenix, AZ (US)

( * ) Notice: Subject to any disclaimer, the term of this patent is extended or adjusted under 35 U.S.C. 154(b) by 0 days.

(21) Appl. No.: 09/764,971

(22) Filed: Jan. 16, 2001

Related U.S. Application Data

(60) Provisional application No. 60/238,605, filed on Oct. 6, 2000.

(51) Int. Cl.[7] .................................................. B60J 7/00
(52) U.S. Cl. .................. 296/190.03; 296/188; 296/102; 280/756
(58) Field of Search ............................ 296/190.03, 188, 296/190.08, 218, 204, 104, 102, 35.2, 37.7, 190; 169/24; 434/67; 280/756, 80.1; 52/694; 182/116; 211/64

(56) References Cited

U.S. PATENT DOCUMENTS

| | | | | |
|---|---|---|---|---|
| 3,622,175 A | * | 11/1971 | Benz et al. .................. 296/104 |
| 3,622,177 A | * | 11/1971 | Notestine et al. ........... 296/102 |
| 3,785,439 A | * | 1/1974 | Britt .............................. 169/24 |
| 3,849,908 A | * | 11/1974 | Sturgeon ...................... 434/67 |
| 3,964,782 A | * | 6/1976 | Pernicka et al. ............. 296/102 |
| 4,135,591 A | * | 1/1979 | Eberle ......................... 280/756 |
| 4,217,970 A | * | 8/1980 | Chika .......................... 296/188 |
| 4,232,755 A | * | 11/1980 | Dow ......................... 296/35.2 |
| 4,538,752 A | * | 9/1985 | Welter ....................... 296/37.7 |
| 4,726,166 A | * | 2/1988 | DeRees ........................ 52/694 |
| 4,800,986 A | * | 1/1989 | Hayes, III .................... 182/116 |
| 4,995,537 A | * | 2/1991 | Thedieck ....................... 211/64 |
| D332,437 S | * | 1/1993 | Lay, Jr. ....................... 296/190 |
| 5,327,989 A | * | 7/1994 | Furuhashi et al. ........... 296/204 |
| 5,743,561 A | * | 4/1998 | Kim ............................ 280/756 |
| 6,149,228 A | * | 11/2000 | O'Neill et al. ......... 296/190.03 |
| 6,189,962 B1 | * | 2/2001 | Henderson ................... 296/218 |
| 6,260,913 B1 | * | 7/2001 | Sekita et al. ........... 296/190.08 |
| 2001/0017228 A1 | * | 8/2001 | Inaoka et al. .............. 280/80.1 |
| 2001/0020377 A1 | * | 9/2001 | Matsuzaki et al. ............ 70/247 |

* cited by examiner

*Primary Examiner*—Ken Patel
(74) *Attorney, Agent, or Firm*—Frank J. McGue

(57) ABSTRACT

An interior enclosure extends along a door frame of a sport utility vehicle from a rollover bar to a dashboard. The interior enclosure comprises two parallel bars. Each parallel bar has a horizontal portion with a rear edge which is adapted to mount to a rollover bar. Each parallel bar further has a leading portion which extends forwardly and downwardly from the horizontal portion. The distal end of the leading portion being mounted to a dashboard. A center cross bar extends between the two horizontal portions proximate to the leading portion.

14 Claims, 5 Drawing Sheets

INTERIOR ENCLOSURE FOR VEHICLES

RELATED APPLICATION

This application is a continuation of provisional application serial No. 60/238,605 filed Oct. 6, 2000.

TECHNICAL FIELD

This invention relates in general to interior enclosures, and, more particularly, to interior enclosures for sport utility vehicles.

BACKGROUND OF THE INVENTION

Interior enclosures are known in the art for use with sport utility vehicles, particularly such vehicles as the Jeep® Wrangler® and the like. Such enclosures are found to be aesthetically pleasing and offer mounting points for speakers, storage devices and the like within the sport utility vehicle.

However, such enclosures are generally floor mounted and require drilling to install. Further, the present systems block air vents for air conditioning and heating or interfere with the window cranks on vehicles. Thus, there is a heed for an interior enclosure which does is not floor mounted and does not block vents or window cranks yet offers the same aesthetics and mounting points as the present systems.

The present invention meets these needs.

SUMMARY OF THE INVENTION

It is an object of this invention to provide an aesthetically pleasing interior enclosure which does not require drilling to install.

It is a further object of this invention to provide a dash mounted interior enclosure which is aesthetically pleasing and offers mounting points for desired accessories.

Further objects and advantages of the invention will become apparent as the following description proceeds and the features of novelty which characterize this invention will be pointed out with particularity in the specification annexed hereto.

BRIEF DESCRIPTION OF THE DRAWINGS

FIG. 4 is a side view of the embodiment of FIG. 2 with the vehicle's top on.

DESCRIPTION OF THE PREFERRED EMBODIMENT

Figure 1:
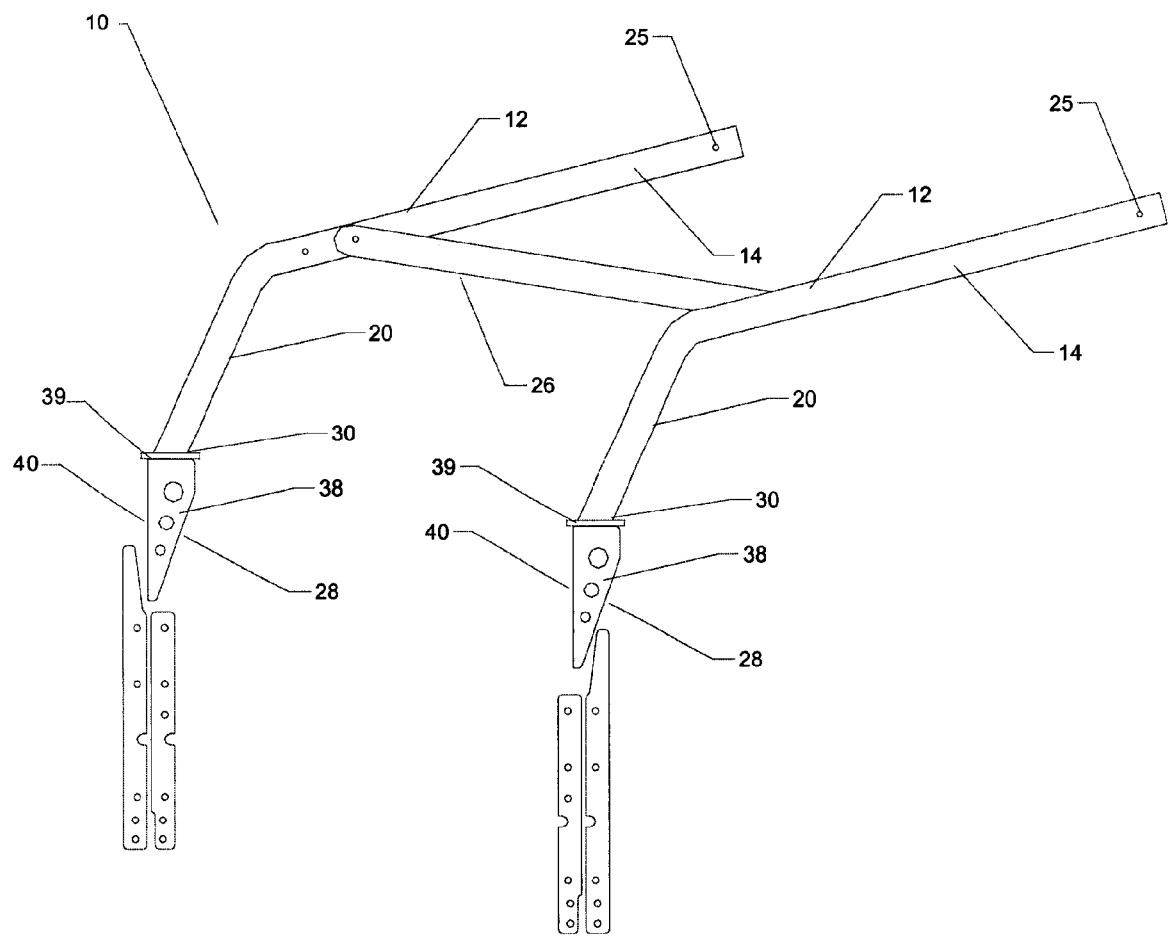
FIG. 1 is a perspective view of an interior enclosure of the present invention.
Figure 2:
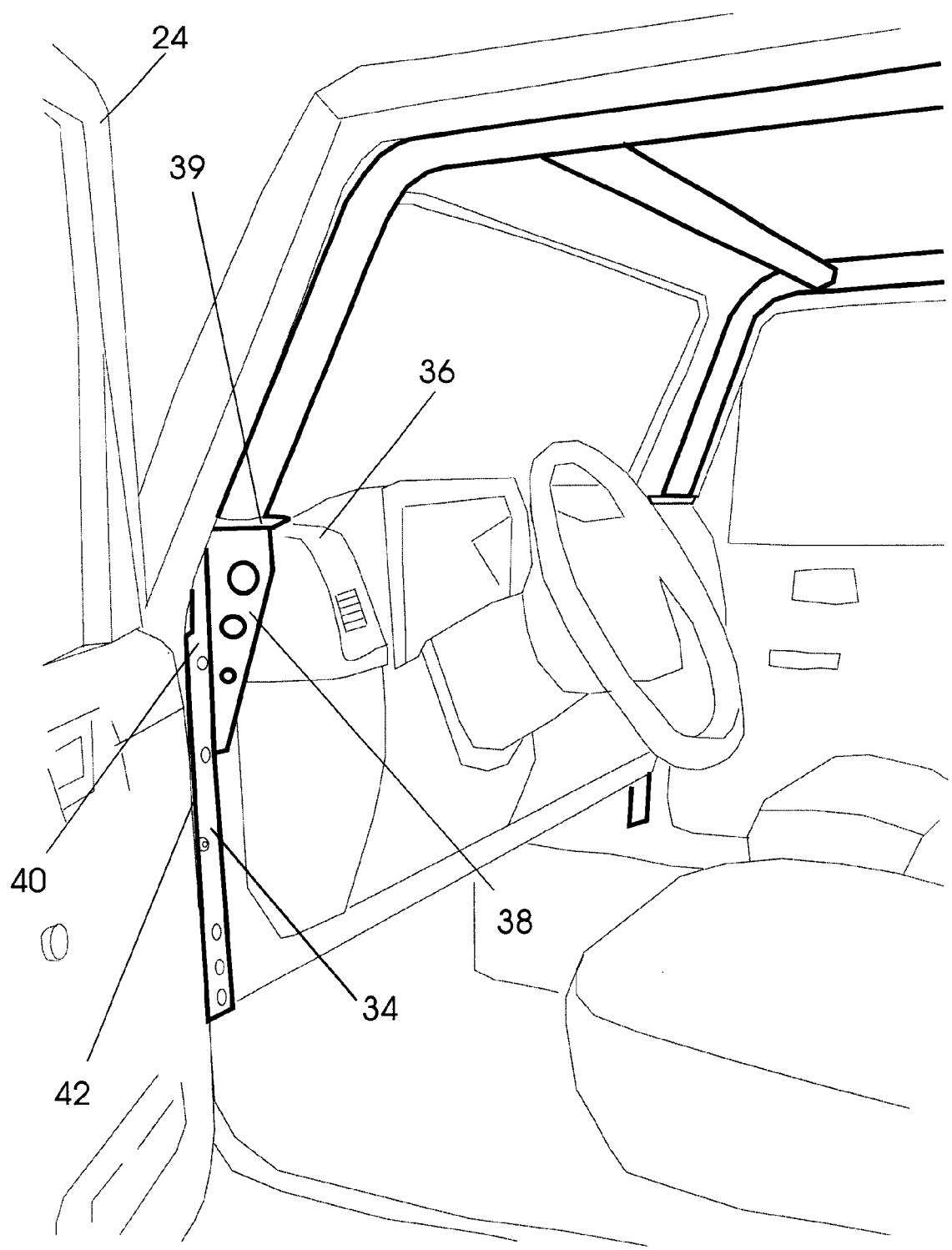
FIG. 2 is a rear and side perspective view of the interior enclosure of the present invention installed on a vehicle.

The present invention is shown in FIGS. 1–5 is an interior enclosure 10 extending along a door frame 16 a sport utility vehicle 18 from a rollover bar 27 to a dashboard 29. Interior enclosure 10 comprises two parallel bars 12 having a horizontal portion 14 with a rear edge 25 which is adapted to mount to rollover bar 27, preferably by welding or bolting. A leading portion 20 extends forwardly and downwardly from horizontal portion 14. A distal end 30 of leading portion 20 has means 28 for mounting to dashboard 29.

Parallel bars 12 are preferably steel tubes and are adapted to conform in shape to the upper edge of door frame 16 of a particular sport utility vehicle 18. Leading portion 20 is adapted to conform in shape to a front edge 22 of the window portion 24 of door frame 16. Leading portion 20, in the illustrated embodiment, extends downward to the top and side of dashboard 29 of sport utility vehicle 18.

In the illustrated example, sport utility vehicle 18 is a Jeep® TJ®. Those skilled in the art will recognize that the exact shapes that bars 12 conform to is dependent upon which sport utility vehicle is used.

Extending between horizontal portions 14 proximate to the leading portion 20 is a center cross bar 26 which provides lateral support for enclosure 10 and further provides mounting points for automobile accessories.

Figure 3:
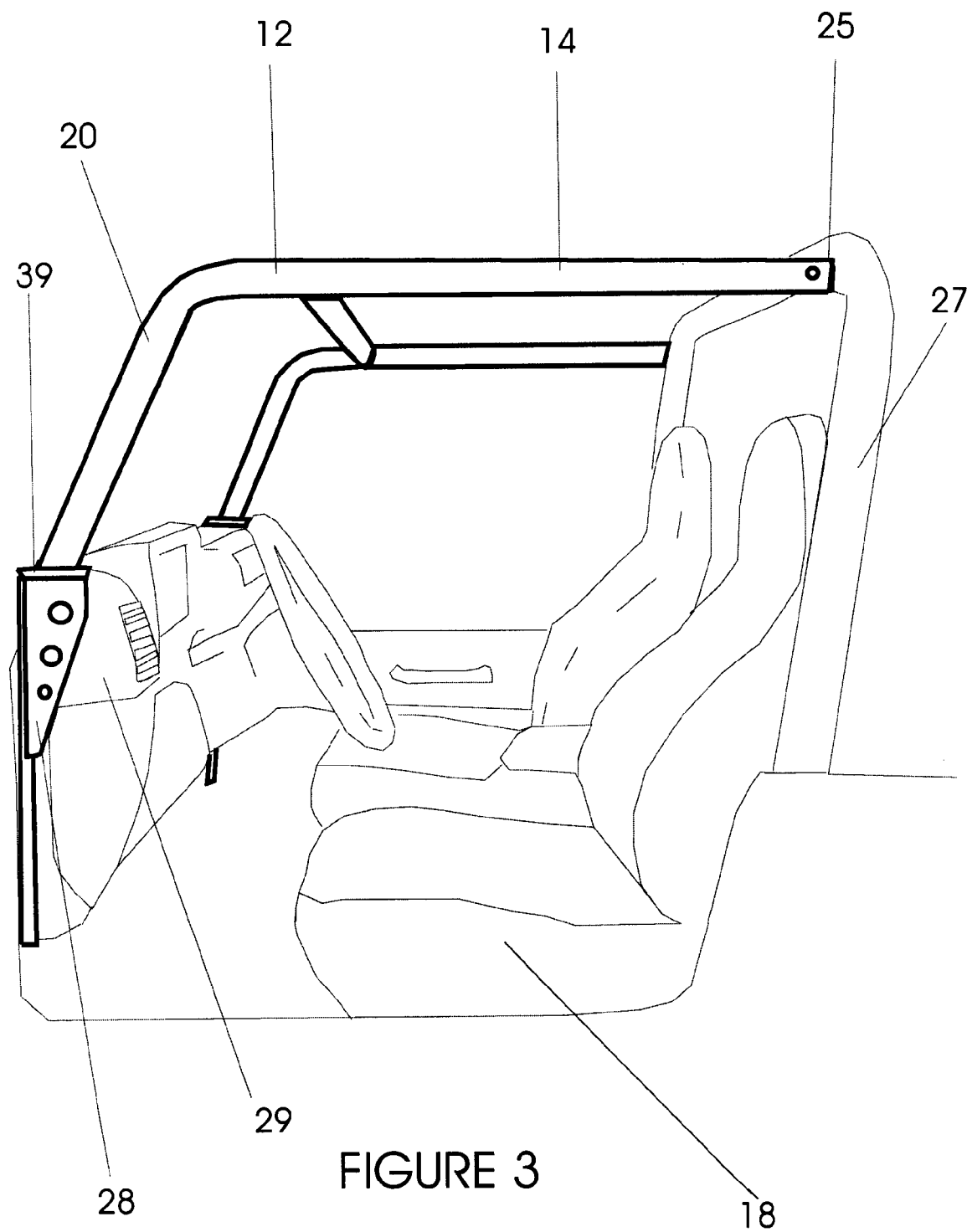
FIG. 3 is a side view of the embodiment of FIG. 2 with the vehicle's top removed.
Figure 4:
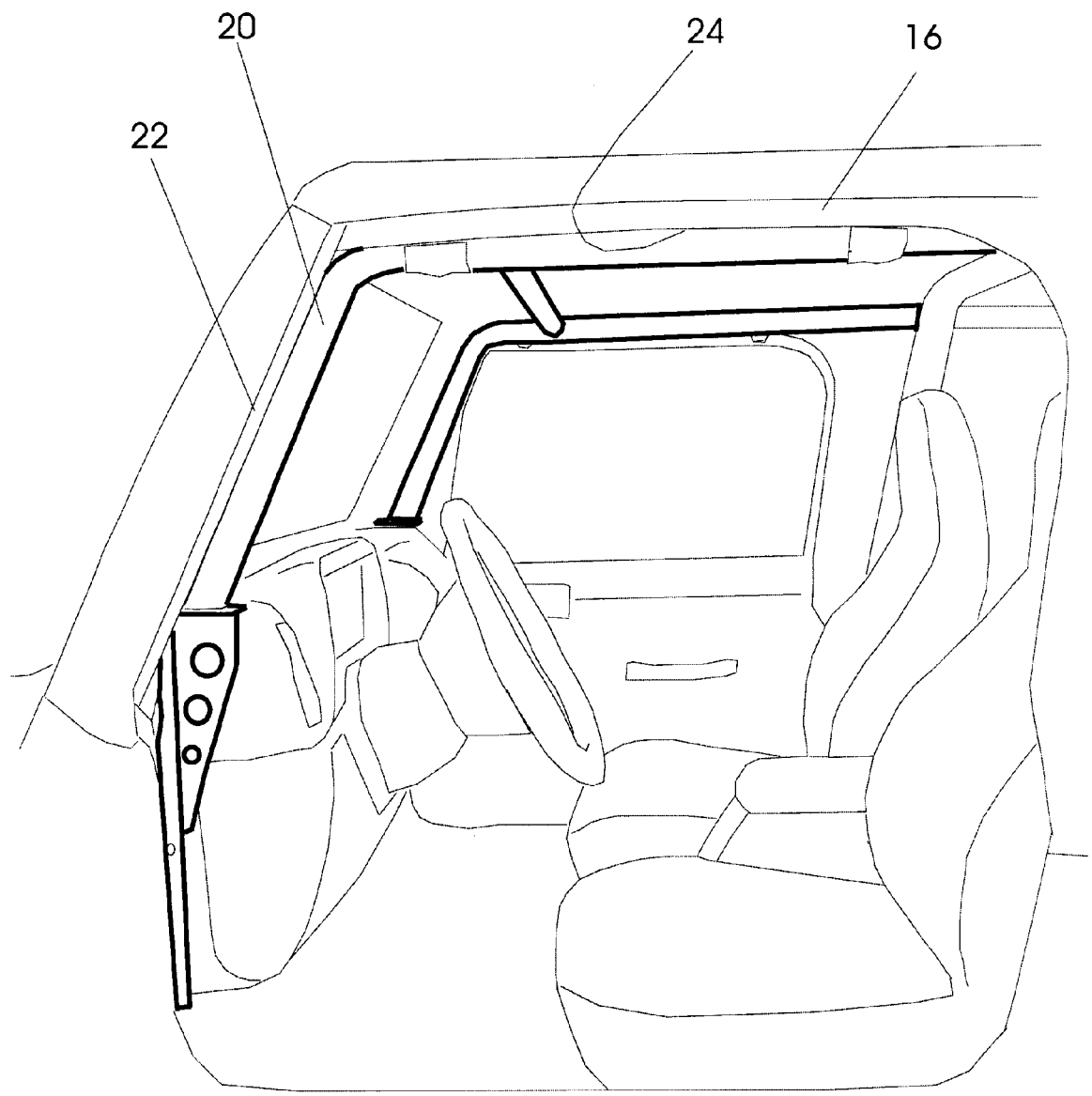
Figure 5:
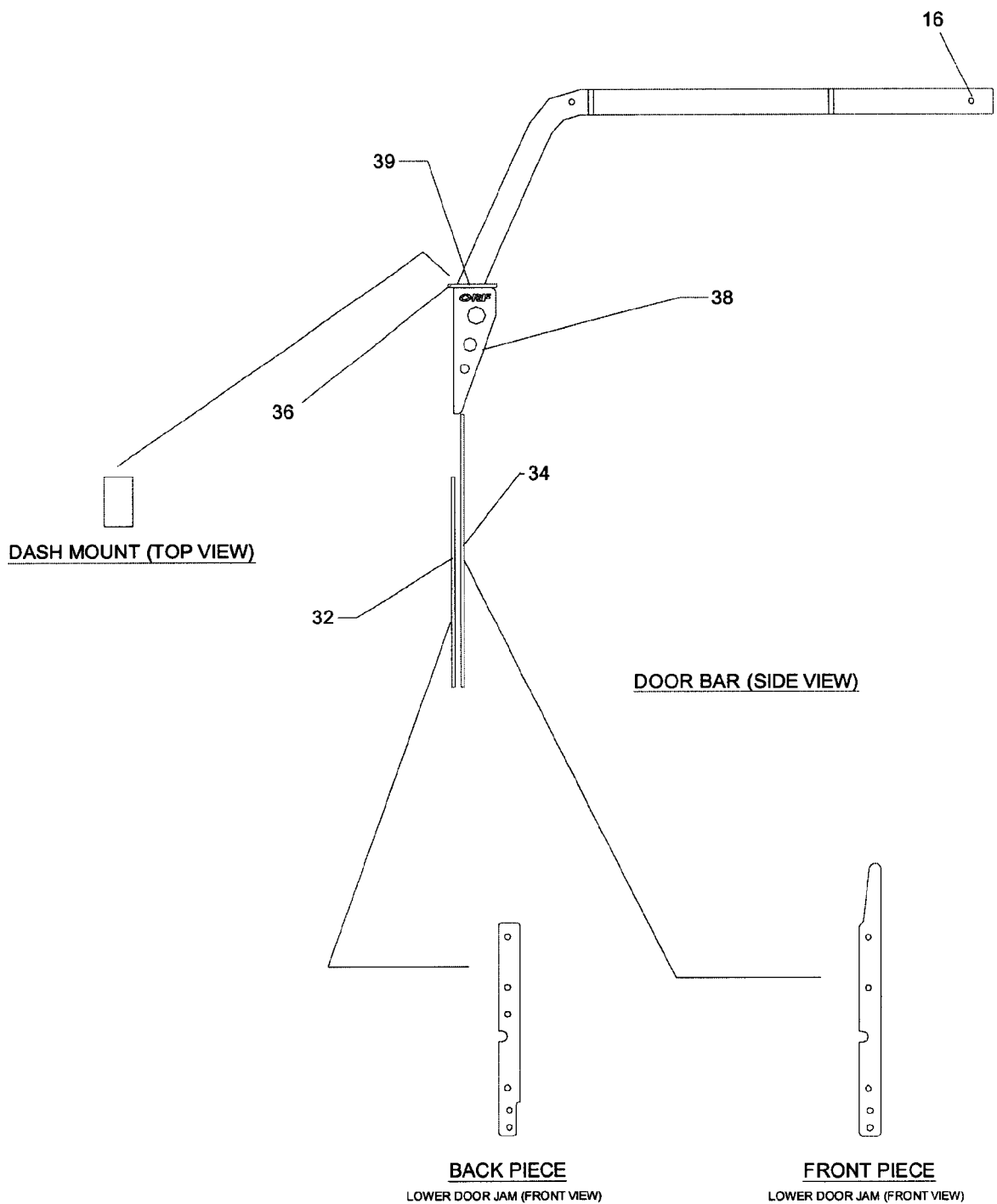
FIG. 5 is a side view of the embodiment of FIG. 1.

Means for mounting 28 to dashboard 29 provided at the distal end 30 of leading portion 20 is best seen in FIGS. 3 and 5. In the presently preferred embodiment, mounting means 28 comprises a back piece 32, a front piece 34, a dashboard piece 36 and a mounting bracket 38.

Mounting bracket 38 is a generally rights triangular, planar piece of metal having a base 39 which is mounted preferably by welding, to distal end 30 and extending downwardly therefrom. A leading edge 40 thereof extends straight downwardly and forms a right angle with front piece 34. Front piece 34 is vertically oriented and extends laterally outwardly from mounting bracket 38. to flatly engage a door jam 42 of sport utility vehicle 18.

Back piece 32 is positioned behind door jam 42 thereby, in combination with front piece 34, capturing door jam 42 therebetween. Bolts (not shown) are inserted through back piece 32 and front piece 34 to secure said pieces. together.

Dashboard piece 36 is a horizontally oriented flat piece which extends laterally inward from bracket 38 to engage the top of the dashboard of sport utility vehicle 18. Dashboard piece 36 provides vertical support for enclosure 10.

Although only certain embodiments have been illustrated and described, it will be apparent to those skilled in the art that various changes and modifications may be made therein without departing from the spirit of the invention.

What is claimed is:

1. An interior enclosure extending along a door frame of a sport utility vehicle from a rollover bar to a dashboard, the interior enclosure comprising:

two parallel bars having a horizontal portion having a rear edge adapted to mount to the rollover bar and a leading portion which extends forwardly and downwardly from the horizontal portion, a distal end of the leading portion having means for mounting to the dashboard, and a center cross bar extending between the two horizontal portions proximate to the leading portion.

2. The interior enclosure of claim 1 wherein the leading portion is adapted to conform in shape to a front edge of a window portion of a door frame.

3. The interior enclosure of claim 1 herein the leading portion extends downward to the top and side of the dashboard of the sport utility vehicle.

4. The interior enclosure of claim 1 wherein the rear edge is attached to the rollover bar.

5. The interior structure of claim 1 wherein the means for mounting to the dashboard comprises a back piece and a front piece adapted to capture a door jam of the sport utility vehicle therebetween, the front piece being mounted to the distal end, a dashboard piece mounted to the distal end adapted to engage the top of the dashboard.

6. The interior enclosure of claim 5 further having a mounting bracket mounted to the distal end, the dashboard piece and the front piece being mounted to the mounting bracket.

7. The interior enclosure of claim 6 wherein the mounting bracket is a right triangular, planar piece of metal having a base is mounted to the distal end, the mounting bracket extending downwardly therefrom, the mounting bracket having a leading edge which extends straight downwardly and forms a right angle with the front piece.

8. The interior enclosure of claim 5 wherein the front piece and the back piece are bolted together.

9. The interior enclosure of claim 5 wherein the dashboard piece is a horizontally oriented flat piece which extends laterally inward from the distal end to engage the top of the dashboard of the sport utility vehicle.

10. An interior enclosure extending along a door frame of a sport utility vehicle from a rollover bar to a dashboard, the interior enclosure comprising:

two parallel bars having a horizontal portion having a rear edge attached to the rollover bar and a leading portion which extends forwardly and downwardly from the horizontal portion, the leading edge being adapted to conform in shape to a front edge of a door frame and extending downwardly to the top and side of the dashboard of the sport utility vehicle, a distal end of the leading portion having means for mounting to the dashboard, the means for mounting to the dashboard comprising a back piece and a front piece adapted to capture a door jam of the sport utility vehicle therebetween, the front piece being mounted to the distal end, a dashboard piece mounted to the distal end adapted to engage the top of the dashboard; and a center cross bar extending between the two horizontal portions proximate to the leading portion.

11. The interior enclosure of claim 10 further having a mounting bracket mounted to the distal end, the dashboard piece and the front piece being mounted to the mounting bracket.

12. The interior enclosure of claim 11 wherein the mounting bracket is a right triangular, planar piece of metal having a base is mounted to the distal end, the mounting bracket extending downwardly therefrom, the mounting bracket having a leading edge which extends straight downwardly and forms a right angle with front piece.

13. The interior enclosure of claim 10 wherein the front piece and the back piece are bolted together.

14. The interior enclosure of claim 10 wherein the dashboard piece is a horizontally oriented flat piece which extends laterally inward from the distal end to engage the top of the dashboard of the sport utility vehicle.

* * * * *